United States Patent
Suh et al.

(10) Patent No.: US 12,092,779 B2
(45) Date of Patent: Sep. 17, 2024

(54) SIMULTANEOUS DISTRIBUTED ACOUSTIC SENSING WITH MULTIPLE GAUGE LENGTHS

(71) Applicant: HALLIBURTON ENERGY SERVICES, INC., Houston, TX (US)

(72) Inventors: Kwang Il Suh, Houston, TX (US); Neha Sahdev, Tomball, TX (US); Ira Bush, Los Angeles, CA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 293 days.

(21) Appl. No.: 17/589,138

(22) Filed: Jan. 31, 2022

(65) Prior Publication Data
US 2023/0243989 A1    Aug. 3, 2023

(51) Int. Cl.
*G01V 1/22*     (2006.01)
*E21B 47/008*   (2012.01)
(Continued)

(52) U.S. Cl.
CPC ............ *G01V 1/226* (2013.01); *E21B 47/008* (2020.05); *E21B 47/114* (2020.05);
(Continued)

(58) Field of Classification Search
CPC ............ G01B 9/02027; G01B 9/02028; G01B 11/002; G01B 2290/45; G01H 9/004; G01D 5/35325; G01D 5/35332; G01D 5/35383
See application file for complete search history.

(56) References Cited

U.S. PATENT DOCUMENTS

| | | | |
|---|---|---|---|
| 9,170,149 B2 | 10/2015 | Hartog | |
| 10,337,316 B2 | 7/2019 | Jaaskelainen et al. | |
| 2012/0255362 A1* | 10/2012 | Den Boer | G01H 9/004 73/655 |
| 2016/0170081 A1 | 6/2016 | Jaaskelainen | |
| 2016/0245077 A1 | 8/2016 | Willis et al. | |

(Continued)

FOREIGN PATENT DOCUMENTS

| | | | |
|---|---|---|---|
| CN | 111473857 A | 7/2020 | |
| WO | WO-2015153549 A1 * | 10/2015 | E21B 47/1005 |

OTHER PUBLICATIONS

Ezzedeen Alfataierge, Ali Aldawood, Andrey Bakulin, Robert R. Stewart, and Harold Merry, (2020), "Influence of gauge length on DAS VSP data at the Houston Research Center test well," SEG Technical Program Expanded Abstracts : 505-509. https://doi.org/10.1190/segam2020-3419066.1 (Year: 2020).*

(Continued)

*Primary Examiner* — Dominic J Bologna
*Assistant Examiner* — Adrian Ignacio Silva
(74) *Attorney, Agent, or Firm* — NOVAK DRUCE CARROLL LLP

(57) ABSTRACT

A method for distributed acoustic sensing includes sending a first optical pulse down an optical fiber, wherein light from the first optical pulse is backscattered from positions along a length of the optical fiber according to coherent Rayleigh scattering; splitting backscattered light from the first optical pulse into a first portion for a first interferometer and a second portion for a second interferometer, the first interferometer having a first gauge length and the second interferometer having a second gauge length, wherein the first gauge length is different from the second gauge length; detecting a first interferometric signal from the first interferometer responsive to the first portion of backscattered light; detecting a second interferometric signal from the first interferometer responsive to the second portion of backs- (Continued)

cattered light; and processing the first and second interferometric signals for two different sensing applications adapted for the first and second gauge lengths, respectively.

20 Claims, 4 Drawing Sheets

(51) Int. Cl.
  *E21B 47/113* (2012.01)
  *E21B 47/117* (2012.01)
  *E21B 47/135* (2012.01)
  *E21B 49/00* (2006.01)
  *G01D 5/353* (2006.01)
(52) U.S. Cl.
  CPC .......... *E21B 47/117* (2020.05); *E21B 47/135* (2020.05); *E21B 49/00* (2013.01); *G01D 5/35325* (2013.01); *G01D 5/35329* (2013.01)

(56) References Cited

U.S. PATENT DOCUMENTS

| | | | |
|---|---|---|---|
| 2017/0090054 A1* | 3/2017 | Willis | G01V 1/42 |
| 2017/0260846 A1* | 9/2017 | Jin | E21B 47/0228 |
| 2018/0003550 A1 | 1/2018 | Dean et al. | |
| 2019/0169985 A1* | 6/2019 | Dickenson | G01K 11/32 |
| 2019/0227184 A1 | 7/2019 | Cuny et al. | |
| 2019/0288475 A1* | 9/2019 | Rao | G01D 5/35361 |
| 2020/0233107 A1 | 7/2020 | Constantinou et al. | |
| 2020/0319358 A1* | 10/2020 | Jaaskelainen | E21B 47/135 |
| 2021/0325238 A1* | 10/2021 | Farhadiroushan | E21B 47/107 |
| 2022/0179113 A1* | 6/2022 | Aldawood | G01V 1/303 |
| 2022/0283330 A1* | 9/2022 | Willis | G01V 1/364 |

OTHER PUBLICATIONS

International Search Report & Written Opinion; PCT Application No. PCT/US2022/014706; mailed Oct. 28, 2022.
English abstract of CN111473857; retrieved from www.espacenet.com on Nov. 2, 2022.

* cited by examiner

SIMULTANEOUS DISTRIBUTED ACOUSTIC SENSING WITH MULTIPLE GAUGE LENGTHS

TECHNICAL FIELD

The subject matter herein generally relates to well monitoring, and in particular, to using optical fiber for well monitoring.

BACKGROUND

Distributed Acoustic Sensing (DAS) is gaining popularity in many applications in well monitoring, such as fracturing monitoring, production monitoring, well integrity monitoring, microseismic, cross-well communication, etc. Each application requires different gauge length for optimal sensitivity and spatial resolution. There is an increasing trend in utilizing multiple DAS systems at the same time on a well to cover multiple applications, which can be expensive and sometimes prohibitive because of the limited number of available optical fiber downhole.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

Figure 1:
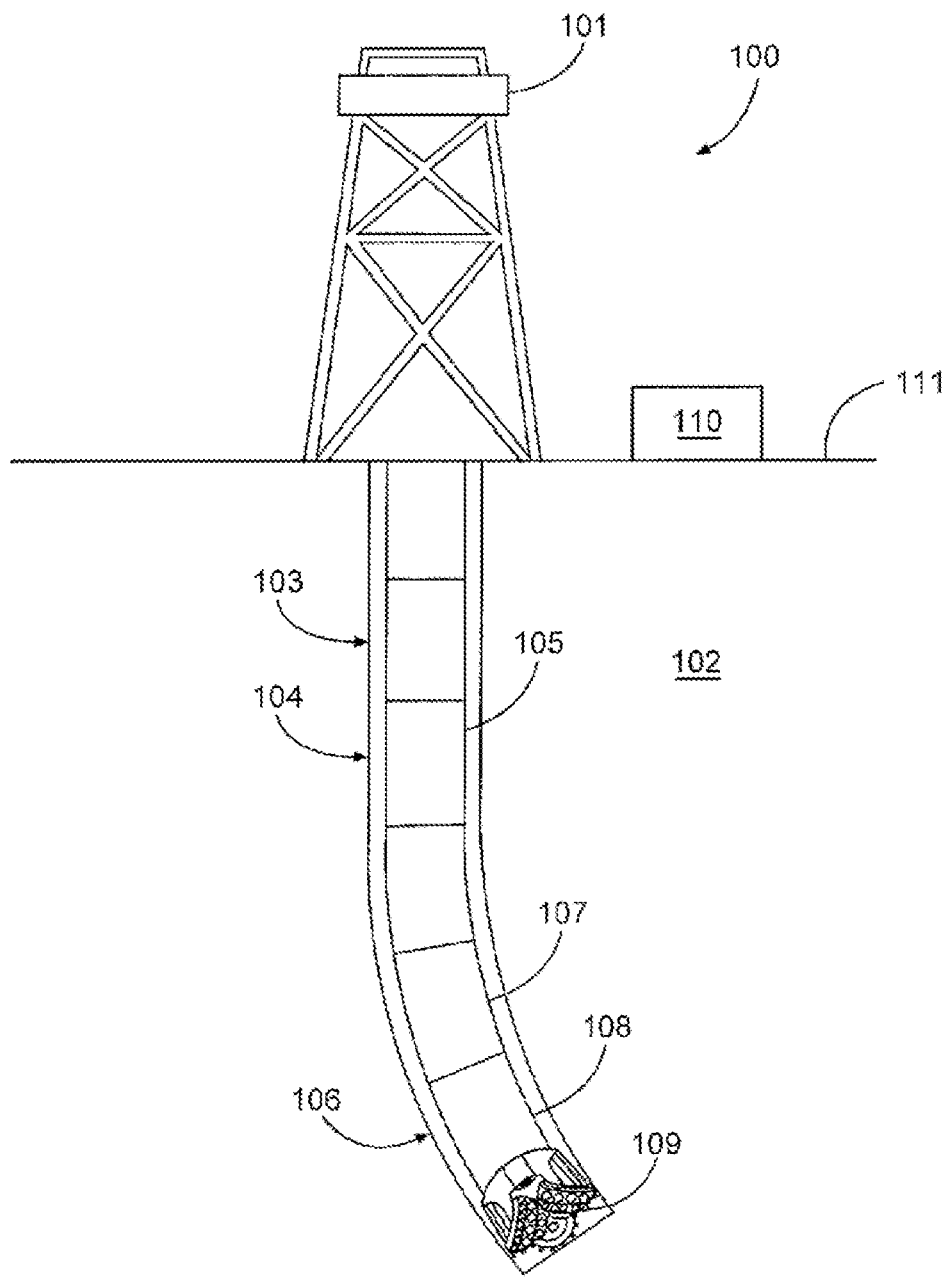
FIG. 1 depicts a hydrocarbon drilling site in accordance with one embodiment of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple," "coupled" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging-while-drilling/measurement-while-drilling (LWD/MWD) methods. Certain embodiments may be applicable to subsea and/or deep-sea wellbores. Embodiments described below with respect to one implementation are not intended to be limiting.

FIG. 1 illustrates an example drilling system 100 according to aspects of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. In other embodiments, the drilling assembly 104 may be coupled to the rig 101 using a wireline or a slickline, for example. The drilling assembly 104 may include a bottom hole assembly (BHA) 106. The BHA 106 may include a drill bit 109, a steering assembly 108, and an LWD/MWD apparatus 107.

A control unit 110 located at the surface 111 may include a processor and memory device, and may communicate with elements of the BHA 106, in the LWD/MWD apparatus 107 and the steering assembly 108. In certain implementations, the control unit 110 may be an information handling system. The control unit 110 may receive data from and send control signals to the BHA 106. Additionally, at least one processor and memory device may be located downhole within the BHA 106 for the same purposes.

The LWD/MWD apparatus 107 may log the formation 102 both while the wellbore 103 is being drilled, and after the wellbore is drilled to provide information regarding ongoing subterranean operations. The steering assembly 108 may include a mud motor that provides power to the drill bit 109, and that is rotated along with the drill bit 109 during drilling operations. The mud motor may be a positive displacement drilling motor that uses the hydraulic power of the drilling fluid to drive the drill bit 109.

In accordance with an exemplary embodiment of the present disclosure, the BHA 106 may include an optionally non-rotatable portion. The optionally non-rotatable portion of the BHA 106 may include any of the components of the BHA 106, excluding the mud motor and the drill bit 109. For instance, the optionally non-rotatable portion may include a drill collar, the LWD/MWD apparatus 107, bit sub, stabilizers, jarring devices and crossovers. In certain embodiments, the steering assembly 108 may angle the drill bit 109 to drill at an angle from the wellbore 103. Maintaining the axial position of the drill bit 109 relative to the wellbore 103 may require knowledge of the rotational position of the drill bit 109 relative to the wellbore 103.

Figure 2:
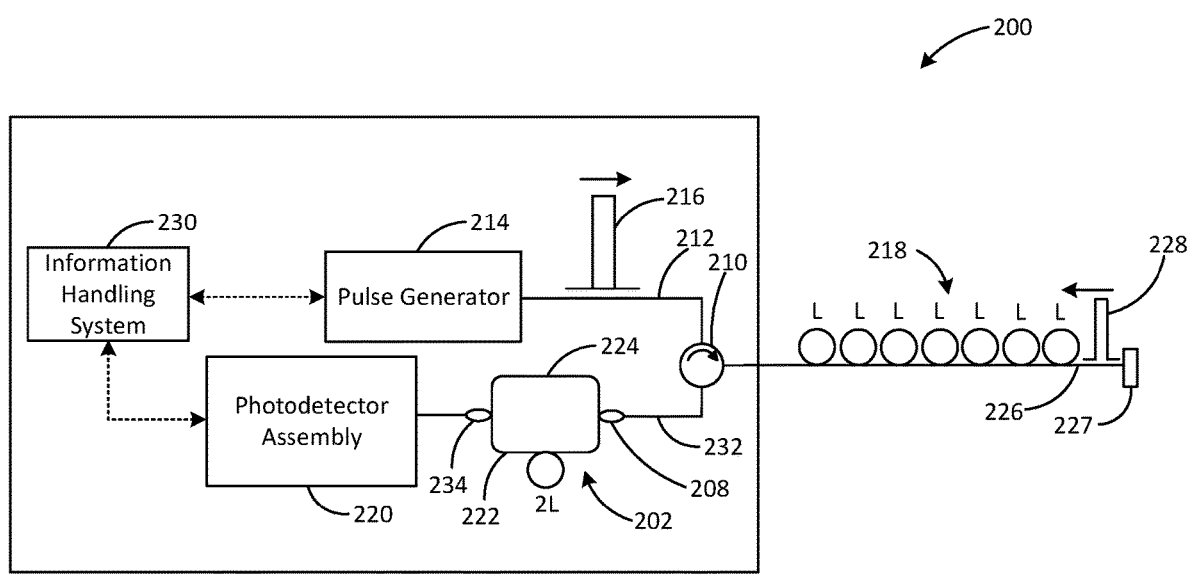
FIG. 2 is a schematic diagram of a distributed acoustic sensing system.

Referring now to FIG. 2, a system for performing Distributed Acoustic Sensing (DAS) is referenced generally by reference numeral 200. The system 200 may be incorporated into the drilling assembly 104 and lowered downhole using a drill string, by wireline, slickline, coiled tubing, or by any other means known to those in the art having the benefit of this disclosure. Alternatively, the system 200 or a portion of the system 200 may be positioned downhole for permanent monitoring and coupled to the casing or tubing. The system 200 may be a coherent Rayleigh scattering system with a single compensating interferometer but is not intended to be limited to such.

Still referring to FIG. 2, a pulse generator 214 may be coupled to a first coupler 210 using the optical fiber 212. The pulse generator 214 may be located at any suitable location when performing subterranean operations. For instance, in some embodiments, the pulse generator 214 may be located at the surface of the wellbore 103. The pulse generator 214 may include associated opto-electronics and laser. The first coupler 210 may be a circulator (as shown), a traditional fused-type fiber optic splitter, a Planar Lightwave Circuit (PLC) fiber optic splitter, or any other type of splitter known to those with ordinary skill in the art having the benefit of this disclosure. Optical pulses from the pulse generator 214 may be amplified using optical gain elements, such as any suitable amplification mechanisms including, but not limited to, Erbium Doped Fiber Amplifiers (EDFAs) or Semiconductor Optical Amplifiers (SOAs).

Still referring to FIG. 2, a second coupler 208 may be coupled to an interferometer 202, such as a compensating interferometer. The second coupler 208 may split light from the optical fiber 232 into two paths along a top interferometer arm 224 and a bottom interferometer arm 222. In other words, the second coupler 208 may split the backscattered light (e.g., backscattered light 228) from the optical fiber 232 into a first backscattered pulse and a second backscattered pulse. The first backscattered pulse may be sent into the top interferometer arm 224. The second backscattered pulse may be sent into the bottom interferometer arm 222. The first and second backscattered pulses from the top and bottom interferometer arms 224, 222 are then re-combined at a third coupler 234 to form an interferometric signal. The second and third couplers 208 and 234 may be a traditional fused type fiber optic splitter, a PLC fiber optic splitter, or any other type of splitter known to those with ordinary skill in the art having the benefit of this disclosure.

The interferometer 202 may be used to determine the relative phase shift variations between the light in the top interferometer arm 224 and the bottom interferometer arm 222 as they recombine. The interferometric signal, i.e., the relative phase shift, will vary over the distance of the distributed optical fiber 226, and the location of the interferometric signal can be determined using time of flight for the optical pulse 216. In the illustrative embodiment of FIG. 2, the interferometer is a Mach-Zehnder interferometer, but it is not intended to be limited to such. For instance, in certain implementations, a Michelson interferometer or any other type of interferometer known to those of skill in the art having the benefit of this disclosure may also be used without departing from the scope of the present disclosure.

The interferometer 202 may be coupled to a photodetector assembly 220. The photodetector assembly 220 may include associated optics and signal processing electronics (not shown). The photodetector assembly 220 may be a semiconductor electronic device that uses the photoelectric effect to convert light to electricity. For example, the photodetector assembly 220 may be an avalanche photodiode or a pin photodiode but is not intended to be limited to such.

As the light from the top interferometer arm 224 and the bottom interferometer arm 222 reach the third coupler 234, the photodetector assembly 220 may convert the optical signal (i.e., the interferometric signal) to an electronic signal proportional to the acoustic signal along the distributed optical fiber 226. The photodetector assembly 220 may be coupled to an information handling system 230. The photodetector assembly 220 and information handling system 230 may be communicatively and/or mechanically coupled. A first device may be communicatively coupled to a second device if it is connected to the second device through a wired or wireless communication network which permits the transmission of information. Thus, the information handling system 230 may be located uphole, downhole, or at a remote location. The information handling system 230 may also be communicatively or mechanically coupled to the pulse generator 214.

In operation of the system 200, the pulse generator 214 may generate a first optical pulse 216, which is transmitted through the optical fiber 212 to the first coupler 210. In certain implementations, the pulse generator 214 may be a laser. The first coupler 210 may direct the first optical pulse 216 through the optical fiber 226. At least a portion of the optical fiber 226 may be arranged in coils 218.

As the first optical pulse 216 travels through the optical fiber 226, imperfections in the optical fiber 226 may cause a portion of the light to be backscattered along the optical fiber 226 due to Rayleigh scattering. Scattered light according to Rayleigh scattering is returned from every point along the optical fiber 226 along the length of the optical fiber 226 and is shown as backscattered light 228 in FIG. 2. This backscatter effect may be referred to as Rayleigh backscatter. Density fluctuations in the optical fiber 226 may give rise to energy loss due to the scattered light, with the following coefficient:

$$\alpha_{scat} = \frac{8\pi^3}{3\lambda^4} n^8 p^2 kT_f \beta \qquad (1)$$

where n is the refraction index, p is the photoelastic coefficient of the optical fiber 226, k is the Boltzmann constant, and β is the isothermal compressibility. $T_f$ is a fictive temperature, representing the temperature at which the density fluctuations are "frozen" in the material.

The optical fiber 226 may be terminated with a low reflection device 227. In certain implementations, the low reflection device 227 may be a fiber coiled and tightly bent to violate Snell's law of total internal reflection such that all the remaining energy is sent out of the fiber. In other implementations, the low reflection device 227 may be an angle cleaved fiber. In still other implementations, the low reflection device 227 may be a coreless optical fiber with high optical attenuation. In still other implementations, the low reflection device 227 may be a termination, such as the AFL® Endlight®.

The backscattered light 228 may travel back through the optical fiber 226, until it reaches the second coupler 208. The first coupler 210 may be mechanically coupled to the second coupler 208 on one side by the optical fiber 232 such that the backscattered light 228 may pass from the first coupler 210 to the second coupler 208 through the optical fiber 232. The second coupler 208 may split the backscattered light 228 based on the number of interferometer arms so that one portion of any backscattered light 228 passing through the interferometer 202 travels through the top interferometer arm 224 and another portion travels through the bottom interferometer arm 222.

In other words, the second coupler 208 may split the backscattered light from the optical fiber 232 into a first backscattered pulse and a second backscattered pulse. The first backscattered pulse may be sent into the top interferometer arm 224. The second backscattered pulse may be sent into the bottom interferometer arm 222. These two portions may be re-combined at the third coupler 234, and at that point, they may generate an interferometric signal. In an interferometric signal, two signals are superimposed from points separated by a distance of L, where L is the difference in length between the top interferometer arm 224 and bottom interferometer arm 222.

The output from the interferometer 202, or the interferometric signal, includes backscattered interfered light from two positions. This interferometric signal may reach the photodetector assembly 220, where it may be converted to an electrical signal. The photodetector assembly 220 may integrate or add up the number of photons received in a given time period. The photodetector assembly 220 may provide output relating to the backscattered light 228 to the information handling system 230, which may convey the data to a display and/or store it in computer-readable media.

In one embodiment, the system 200 relies on detecting phase changes in backscattered light signals to determine changes in strain (e.g., caused by acoustic waves) along the length of optical fiber 226. To measure the phase changes, measurements of light signals from two different points along the optical fiber 226 are taken to determine an average amount of strain over that distance. The distance between these two points may be referred to as the "gauge length." Gauge length affects sensitivity and spatial resolution of the system 200. Therefore, given the desired application of the system 200 (e.g., detecting perforations, monitoring downhole pumps and hardware, sensing acoustic signals during fracturing and in-flow stimulation, water injection, production monitoring, flow regimes, reflection seismic, microseismic, leaks, cross-flow, and formation compaction), different systems 200 using interferometers 202 with different physical gauge lengths may be used. As previously noted, there is an increasing trend in utilizing multiple DAS systems 200 at the same time on a well to cover multiple applications. However, this can be expensive and sometimes prohibitive because of the limited number of available optical fiber downhole.

Other approaches, such as the one used in U.S. App. No. 2019/0227184, provide a local oscillator with single interferometer, and then processes the raw data in software. This method can generate data with any number of different gauge lengths, but it requires re-processing of the raw data. As such, it is not able to generate data with multiple gauge lengths simultaneously in real time. Still other approaches, such as the one used in U.S. Pat. No. 10,337,316 relies on optical switch(es) to select different gauge lengths for different applications. However, it can only use one gauge length at a time.

Figure 3:
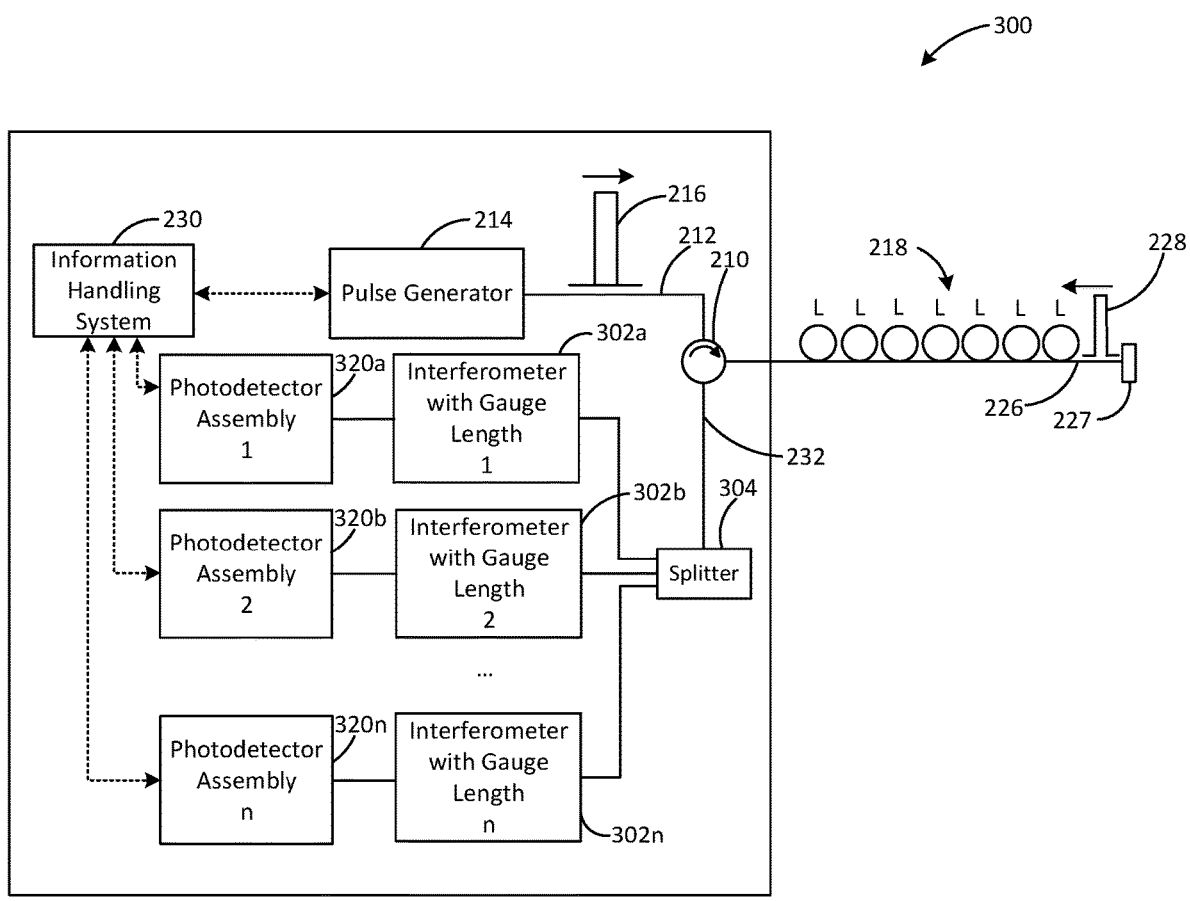
FIG. 3 is a schematic diagram of a distributed acoustic sensing system in accordance with one embodiment of the present disclosure.

Referring to FIG. 3, there is shown an embodiment of a DAS system 300 in accordance with the present disclosure that is capable of utilizing multiple gauge lengths at the same time, providing greater flexibility than earlier approaches. The DAS system 300 may include many of the components of system 200, which have been designated with like reference numerals, and will not be discussed in detail here.

In one embodiment, the DAS system 300 may include a plurality of (two or more) interferometers 302a-n. Each of interferometer 302a-n may be similar to the interferometer 202 of FIG. 2. However, any suitable interferometer known to those of skill in the art having the benefit of this disclosure may also be used without departing from the scope of the present disclosure. For example, a Mach-Zehnder interferometer, a Michelson interferometer or other suitable interferometer may be used.

Although not illustrated, the interferometers 302a-n may each include interferometer arms 222, 224 (as shown in FIG. 2). The interferometer arms 222, 224 of the interferometers 302a-n may each be of a different length. Thus, the backscattered light 228 may travel through the interferometer arms 222, 224, varying the distance over which the reflected optical pulse may travel, thereby changing the gauge length and, thus, the sensitivity and spatial resolution.

The first coupler 210 (e.g., circulator) may couple the optical fiber 226 to a splitter 304, which may be embodied as a traditional fused-type fiber optic splitter, a PLC fiber optic splitter, or any other type of splitter known to those with ordinary skill in the art having the benefit of this disclosure. The splitter 304 may be coupled to the interferometers 302a-n and may split the backscattered light 228 into as many portions as there are interferometers 302a-n.

As explained with reference to FIG. 2, the interferometers 302a-n receive convert the backscattered light 228 into interferometric signals. In one embodiment, each interferometer 302a-n is coupled to a respective photodetector assembly 320a-n, which may be similar to the photodetector assembly 220 of FIG. 2. Each photodetector assembly 320a-n is in electronic communication with the information handling system 230. This allows the information handling system 230 to receive and process data from the photodetector assemblies 320a-n simultaneously and in parallel. Thus, in the present embodiment, multiple interferometers 302a-n having different gauge lengths can probe a single optical fiber 226 at the same time, allowing for multiple sensing applications to be carried out simultaneously with the same hardware.

Furthermore, the illustrated embodiment allows multiple sensitivities and spatial resolutions to be simultaneously available in-situ depending on the needs of the DAS system 300. Applications where active sources are used may generate strong acoustic signals, and users may prefer to have the system settings selected to provide higher spatial resolution with good signal-to-noise ratios. The well depth as well as the associated signal paths may vary. Thus, shallow applications may have a stronger signal, whereas signals in deep wells may experience higher signal attenuation due to the longer travel path for acoustic signals. It may therefore be beneficial to change the difference in path length to optimize the signal-to-noise ratio dependent on the attenuation of the acoustic signals or on the application. Other applications may include micro-seismic sensing and/or passive sensing where small micro-seismic events in the formation may generate noise, and it may be beneficial to record these events and use them for reservoir characterization and optimization.

As used herein, the term "spatial resolution" refers to the ability to discriminate between two adjacent acoustic events along an optical fiber. It is generally desirable to have a fine spatial resolution in a system to allow for detection of events that are spatially near each other, like perforations in a hydrocarbon well, for example. The spatial resolution of the system 300 when using a given interferometer 302a-n is a function of the width of the first optical pulse 216 and the difference in length between the top interferometer arm 224 (shown in FIG. 2), and the bottom interferometer arm 222. The sensitivity of the system 300 when accessing a given interferometer 302a-n is a function of the difference in length between the top interferometer arm 224 and the bottom interferometer arm 22, and a greater difference in length between these two fibers improves the system's sensitivity to acoustic and/or vibrational energy. In other words, greater sensitivity allows the system 300 to detect acoustic and/or vibrational events with smaller signal amplitude.

Additional optical pulses may be sent into the optical fiber 226 from the pulse generator 214 in close succession and at a fixed rate. By measuring the backscattered interfered light (interferometric signals) from each of these optical pulses at the photodetector assembly 220, a discrete representation of the change in acoustic energy in the wellbore may be measured as a function of time. The changes in acoustic energy may then be correlated with sub-surface events. For example, a change in acoustic energy may be related to a change in flow, a change in solids in a fluid, or a change in the oil/water/gas ratio present in the wellbore 103. The pulse generator 214 may be operable to vary the pulse width of optical pulses it generates, which, in turn, varies the spatial resolution. Further, the differential path length difference between two selected interferometer arms may be varied. In this way, the spatial resolution of the system 300 may be varied in parallel for a number of simultaneous sensing applications.

Figure 4:
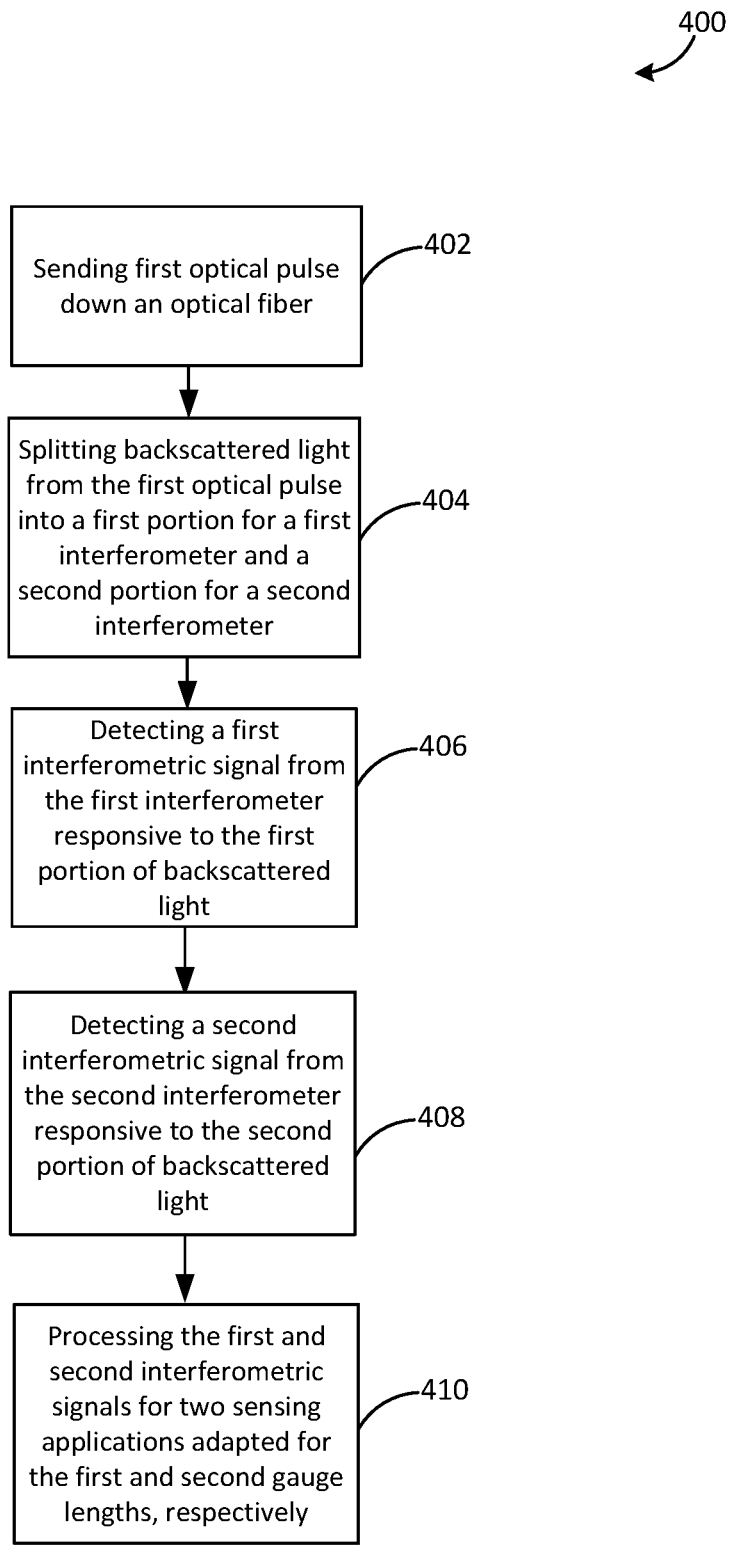
FIG. 4 is a flowchart of a distributed acoustic sensing method in accordance with one embodiment of the present disclosure.

FIG. 4 is a flowchart of a method 400 for a distributed acoustic sensing according to an embodiment of the disclosure. The method 400 begins at step 402 by sending a first optical pulse down an optical fiber, wherein light from the first optical pulse is backscattered from positions along the length of the optical fiber according to coherent Rayleigh scattering. Step 404 includes splitting backscattered light from the first optical pulse into a first portion for a first interferometer and a second portion for a second interferometer (or up to n portions for up to n interferometers), the first interferometer having a first gauge length and the second interferometer having a second gauge length.

Step 406 includes detecting a first interferometric signal from the first interferometer responsive to the first portion of backscattered light. Step 408 includes detecting a second interferometric signal from the first interferometer responsive to the first portion of backscattered light (or up to n interferometric signals for up to n interferometers). In some embodiments, the first and second interferometric signals may indicate different downhole conditions, such as, without limitation, perforations, monitoring downhole pumps and hardware, sensing acoustic signals during fracturing and in-flow stimulation, water injection, production monitoring, flow regimes, reflection seismic, micro-seismic, leaks, cross-flow, and formation compaction.

Finally, step 410 includes processing the first and second interferometric signals for two different sensing applications adapted for the first and second gauge lengths, respectively (or up to n different sensing applications adapted for up to n different gauge lengths using the output of up to n interferometers). For example, the sensing applications may be for sensing two (or more) of the aforementioned downhole conditions.

In some aspects, the distributed acoustic sensing is provided according to one or more of the following statements of the disclosure.

Statement 1. A distributed acoustic sensing system, comprising: a first interferometer having a first gauge length; a second interferometer having a second gauge length, wherein the second gauge length is different from the first gauge length; a pulse generator to generate an optical pulse; a coupler, communicatively coupled to the pulse generator, to direct the optical pulse down an optical fiber and receive backscattered light from the optical fiber caused by the optical pulse; a splitter, communicatively coupled to the coupler and first and second interferometers, to split the backscattered light into a first portion for the first interferometer and a second portion for the second interferometer; a first photodetector assembly to detect a first interferometric signal from the first interferometer responsive to the first portion of backscattered light; a second photodetector assembly to detect a second interferometric signal from the second interferometer responsive to the second portion of backscattered light; and an information handling system, coupled to the first and second photodetector assemblies, to receive and process the first and second interferometric signals for two different sensing applications adapted for the first and second gauge lengths, respectively.

Statement 2. The distributed acoustic sensing system of statements 1, wherein the splitter is to split the backscattered light into a third portion for a third interferometer coupled to the splitter, the third interferometer having a third gauge length, further comprising: a third photodetector assembly, coupled to the third interferometer, to detect a third interferometric signal from third portion of backscattered light, wherein the information handling system receives and processes the first, second, and third interferometric signals for three sensing applications adapted for the first, second, and third gauge lengths, respectively.

Statement 3. The distributed acoustic sensing system of statements 1-2, wherein the first gauge length provides a first spatial resolution and the second gauge length provides a second spatial resolution.

Statement 4. The distributed acoustic sensing system of statements 1-3, wherein the information handling system simultaneously receives and process the first and second interferometric signals for the two different sensing applications in real time.

Statement 5. The distributed acoustic sensing system of statements 1-4, wherein the coupler comprises a circulator.

Statement 6. The distributed acoustic sensing system of statement 1-5, wherein the optical fiber is adapted to be disposed downhole.

Statement 7. The distributed acoustic sensing system of statement 1-6, wherein the optical fiber is coupled to at least one of a casing and a tubing.

Statement 8. The distributed acoustic sensing system of statement 1-7, wherein the first and second interferometric signals are representative of two different downhole conditions.

Statement 9. The distributed acoustic sensing system of statement 1-8, wherein the two different downhole conditions are selected from a group consisting of: perforations, monitoring downhole pumps and hardware, sensing acoustic signals during fracturing and in-flow stimulation, water injection, production monitoring, flow regimes, reflection seismic, micro-seismic, leaks, cross-flow, and formation compaction.

Statement 10. The distributed acoustic sensing system of statement 1-9, further comprising: a low reflection device coupled to the optical fiber.

Statement 11. The distributed acoustic sensing system of statement 1-10, wherein the pulse generator is operable to generate optical pulses having variable pulse widths.

Statement 12. The distributed acoustic sensing system of statement 1-11, wherein the backscattered light comprises Rayleigh backscatter.

Statement 13. A method for distributed acoustic sensing comprising: sending a first optical pulse down an optical fiber, wherein light from the first optical pulse is backscattered from positions along a length of the optical fiber according to coherent Rayleigh scattering; splitting backscattered light from the first optical pulse into a first portion for a first interferometer and a second portion for a second interferometer, the first interferometer having a first gauge length and the second interferometer having a second gauge length, wherein the first gauge length is different from the second gauge length; detecting a first interferometric signal from the first interferometer responsive to the first portion of backscattered light; detecting a second interferometric signal from the first interferometer responsive to the first portion of backscattered light; and processing the first and second interferometric signals for two different sensing applications adapted for the first and second gauge lengths, respectively.

Statement 14. The method of statement 13, further comprising: splitting the backscattered light into a third portion for a third interferometer having a third gauge length; detecting a third interferometric signal from third portion of backscattered light; and processing the first, second, and third interferometric signals for three sensing applications adapted for the first, second, and third gauge lengths, respectively.

Statement 15. The method of statements 13-14, wherein the first gauge length provides a first spatial resolution and the second gauge length provides a second spatial resolution.

Statement 16. The method of statements 13-15, wherein processing the first and second interferometric signals comprises simultaneously processing the first and second interferometric signals for the two different sensing applications in real time.

Statement 17. The method of statements 13-16, further comprising coupling the optical fiber to at least one of a casing and a tubing.

Statement 18. The method of statements 13-17, wherein sending a first optical pulse down an optical fiber comprises generating optical pulses having variable pulse widths.

Statement 19. The method of statement 13-18, wherein the first and second interferometric signals are representative of two different downhole conditions, and wherein the two different downhole conditions are selected from a group consisting of: perforations, monitoring downhole pumps and hardware, sensing acoustic signals during fracturing and in-flow stimulation, water injection, production monitoring, flow regimes, reflection seismic, micro-seismic, leaks, cross-flow, and formation compaction.

Statement 20. A non-transitory computer readable medium comprising program code that, when executed by a processor, cause the processor to perform a method for distributed acoustic sensing, the method comprising: sending a first optical pulse down an optical fiber, wherein light from the first optical pulse is backscattered from positions along a length of the optical fiber according to coherent Rayleigh scattering; splitting backscattered light from the first optical pulse into a first portion for a first interferometer and a second portion for a second interferometer, the first interferometer having a first gauge length and the second interferometer having a second gauge length, wherein the first gauge length is different from the second gauge length; detecting a first interferometric signal from the first interferometer responsive to the first portion of backscattered light; detecting a second interferometric signal from the first interferometer responsive to the first portion of backscattered light; and processing the first and second interferometric signals for two different sensing applications adapted for the first and second gauge lengths, respectively.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A distributed acoustic sensing system, comprising:
a first interferometer having a first gauge length, a first arm, and a second arm, wherein the first arm of the first interferometer has a first path length, the second arm of the first interferometer has a second path length, and a path length difference corresponds to a difference between the first path length and the second path length of the first interferometer;
a second interferometer having a second gauge length, wherein the second gauge length is different from the first gauge length;
a pulse generator that transmits optical pulses at a fixed rate with varying pulse widths to adjust a spatial resolution of the distributed acoustic sensing system;
a coupler, communicatively coupled to the pulse generator, that:
directs the optical pulses transmitted at the fixed rate with the varying pulse widths down an optical fiber, and
directs backscattered light associated with the optical pulses transmitted at the fixed rate with the varying pulse widths from the optical fiber;
a splitter, communicatively coupled to the coupler, the first interferometer, and the second interferometer, wherein:
the path length difference of the first interferometer is changed to further adjust the spatial resolution of the distributed acoustic sensing system, and
the splitter splits the backscattered light into a first portion for the first interferometer and a second portion for the second interferometer;
a first photodetector assembly to detect a first interferometric signal from the first interferometer responsive to the first portion of backscattered light;
a second photodetector assembly to detect a second interferometric signal from the second interferometer responsive to the second portion of backscattered light; and
an information handling system, coupled to the first and the second photodetector assemblies, to receive and process the first and the second interferometric signals for at least two different sensing applications adapted for the first and the second gauge lengths, respectively, wherein the processing of the first and the second interferometric signals for the at least two different sensing applications is based on the optical pulses being transmitted at the fixed rate with the varying pulse widths.

2. The distributed acoustic sensing system of claim 1, further comprising:
a third interferometer having a third gauge length, wherein the splitter also splits the backscattered light into a third portion for the third interferometer; and
a third photodetector assembly coupled to the third interferometer to detect a third interferometric signal from the third portion of backscattered light, wherein the information handling system receives and processes the first, the second, and the third interferometric signals for three sensing applications adapted for the first, the second, and the third gauge lengths, respectively.

3. The distributed acoustic sensing system of claim 1, wherein:
the first gauge length provides a first spatial resolution and the second gauge length provides a second spatial resolution, and
the first spatial resolution and the second spatial resolution vary based on the varying pulse widths.

4. The distributed acoustic sensing system of claim 1, wherein:
a signal-to-noise (SNR) ratio is improved based on the change of the path length difference of the first interferometer, and
the information handling system simultaneously receives and process the first and the second interferometric signals for the at least two different sensing applications in real time.

5. The distributed acoustic sensing system of claim 1, wherein the coupler comprises a circulator.

6. The distributed acoustic sensing system of claim 1, wherein:
the optical fiber is adapted to be disposed downhole, and
the adjustments to the spatial resolution are performed to discriminate between two acoustic events when the optical fiber is disposed downhole.

7. The distributed acoustic sensing system of claim 1, wherein the optical fiber is coupled to at least one of a casing and a tubing.

8. The distributed acoustic sensing system of claim 1, wherein:
a first application of the at least two sensing applications is associated with operation of a first hardware apparatus, and
a second application of the at least two different sensing applications is associated with operation of a second hardware apparatus.

9. The distributed acoustic sensing system of claim 1, wherein:
the at least two different sensing applications are selected from a group consisting of:
detecting perforations,
monitoring production,
monitoring downhole pumps and hardware,
sensing acoustic signals during fracturing and in-flow stimulation,
monitoring water injection,
flow regime monitoring,
micro-seismic data collection,
leak detection,
cross-flow monitoring, and
formation compaction monitoring.

10. The distributed acoustic sensing system of claim 1, further comprising:
a fiber optic termination.

11. The distributed acoustic sensing system of claim 1, wherein the pulse generator transmits the optical pulses at the fixed rate with the varying pulse widths in succession.

12. The distributed acoustic sensing system of claim 11, wherein the backscattered light comprises Rayleigh backscatter.

13. A method for distributed acoustic sensing comprising:
sending optical pulses at a fixed rate with varying pulse widths down an optical fiber to adjust a spatial resolution of a distributed acoustic sensing system, wherein light from the optical pulses sent at the fixed rate with the varying pulse widths is backscattered from positions along a length of the optical fiber;
splitting the backscattered light from the optical pulses sent at the fixed rate with the varying pulse widths into a first portion for a first interferometer and a second portion for a second interferometer, the first interferometer having a first gauge length, a first arm, and a second arm, and the second interferometer having a second gauge length, wherein;
the first arm of the first interferometer has a first path length, the second arm of the first interferometer has a second path length,
a path length difference corresponds to a difference between the first path length and the second path length of the first interferometer, and
the first gauge length is different from the second gauge length;
changing the path length difference of the first interferometer to further adjust the spatial resolution of the distributed acoustic sensing system;
detecting a first interferometric signal from the first interferometer responsive to the first portion of backscattered light;
detecting a second interferometric signal from the first interferometer responsive to the second portion of backscattered light; and
processing the first and the second interferometric signals for at least two different sensing applications adapted for the first and the second gauge lengths, respectively, wherein the processing of the first and the second interferometric signals for the at least two different sensing applications is based on the optical pulses being transmitted at the fixed rate with the varying pulse widths.

14. The method of claim 13, further comprising:
splitting the backscattered light into a third portion for a third interferometer having a third gauge length;
detecting a third interferometric signal from the third portion of backscattered light; and
processing the first, the second, and the third interferometric signals for three sensing applications adapted for the first, the second, and the third gauge lengths, respectively.

15. The method of claim 13, wherein;
the first gauge length provides a first spatial resolution and the second gauge length provides a second spatial resolution, and
the first spatial resolution and the second spatial resolution vary based on the varying pulse widths.

16. The method of claim 13, wherein processing the first and the second interferometric signals comprises simultaneously processing the first and the second interferometric signals for the at least two different sensing applications in real time.

17. The method of claim 13, further comprising coupling the optical fiber to at least one of a casing and a tubing.

18. The method of claim 13, wherein the optical pulses sent at the fixed rate with the varying pulse widths are sent in succession.

19. The method of claim 13, wherein the at least two different sensing applications are selected from a group consisting of:

detecting perforations,
monitoring production,
monitoring downhole pumps and hardware,
sensing acoustic signals during fracturing and in-flow stimulation,
monitoring water injection,
flow regime monitoring,
micro-seismic data collection,
leak detection,
cross-flow monitoring, and
formation compaction monitoring.

20. A non-transitory computer-readable storage medium having embodied thereon instructions that when executed by one or more processors implement a method for distributed acoustic sensing, the method comprising:
initiating transmission of optical pulses at a fixed rate with varying pulse widths down an optical fiber to adjust a spatial resolution of a distributed acoustic sensing system, wherein light associated with the optical pulses transmitted at the fixed rate with the varying pulse widths is backscattered from positions along a length of the optical fiber;
splitting the backscattered light into a first portion for a first interferometer and a second portion for a second interferometer, the first interferometer having a first gauge length a first arm, and a second arm, and the second interferometer having a second gauge length, wherein:
the first arm of the first interferometer has a first path length, the second arm of the first interferometer has a second path length,
a path length difference corresponds to a difference between the first path length and the second path length of the first interferometer, and
the first gauge length is different from the second gauge length;
changing the path length difference of the first interferometer to further adjust the spatial resolution of the distributed acoustic sensing system;
detecting a first interferometric signal from the first interferometer responsive to the first portion of backscattered light;
detecting a second interferometric signal from the first interferometer responsive to the first portion of backscattered light; and
processing the first and the second interferometric signals for at least two different sensing applications adapted for the first and the second gauge lengths, respectively, wherein the processing of the first and the second interferometric signals for the at least two different sensing applications is based on the pulses being transmitted at the fixed rate with the varying pulse widths.

* * * * *